United States Patent
Sekiguchi

(10) Patent No.: US 11,207,851 B2
(45) Date of Patent: Dec. 28, 2021

(54) PUNCTURE REPAIR LIQUID HOLDING CONTAINER

(71) Applicant: The Yokohama Rubber Co., LTD., Tokyo (JP)

(72) Inventor: Takumi Sekiguchi, Hiratsuka (JP)

(73) Assignee: The Yokohama Rubber Co., LTD.

( * ) Notice: Subject to any disclaimer, the term of this patent is extended or adjusted under 35 U.S.C. 154(b) by 160 days.

(21) Appl. No.: 16/478,463

(22) PCT Filed: Nov. 2, 2017

(86) PCT No.: PCT/JP2017/039656
§ 371 (c)(1),
(2) Date: Jul. 16, 2019

(87) PCT Pub. No.: WO2018/135085
PCT Pub. Date: Jul. 26, 2018

(65) Prior Publication Data
US 2019/0389158 A1    Dec. 26, 2019

(30) Foreign Application Priority Data

Jan. 17, 2017  (JP) .............................. JP2017-006132

(51) Int. Cl.
*B29C 73/02* (2006.01)
*B29C 73/16* (2006.01)
(Continued)

(52) U.S. Cl.
CPC ............ *B29C 73/02* (2013.01); *B29C 73/166* (2013.01); *B29C 73/24* (2013.01); *B60C 23/00* (2013.01);
(Continued)

(58) Field of Classification Search
CPC ........ B29C 73/02; B29C 73/166; B29C 73/24; B60C 23/00; B65D 83/00; B65D 2501/24242
(Continued)

(56) References Cited

FOREIGN PATENT DOCUMENTS

| JP | S57-035600 | 2/1982 |
|---|---|---|
| JP | 2007-062241 | 3/2007 |

(Continued)

OTHER PUBLICATIONS

Yoshida et al. (JP 2010-167742-A), machine translation Feb. 12, 2021 (Year: 2010).*

(Continued)

*Primary Examiner* — Seyed Masoud Malekzadeh
*Assistant Examiner* — Lawrence D. Hohenbrink, Jr.
(74) *Attorney, Agent, or Firm* — Thorpe North & Western

(57) ABSTRACT

Provided is a puncture repair liquid holding container. An outflow channel in a cap mounted to an opening portion of a container body for discharging the puncture repair liquid inside the container interior to a container exterior includes a straight portion including an open end opening toward inside the container body and a closed end terminating inside the cap, and a branching portion including a communicating end communicating with an intermediate area of the straight portion and an open end opening toward the container exterior. A through-hole is at the closed end of the straight portion. A projection on a closing plug and slidably inserted to the straight portion is slidably inserted to the through-hole. States are switchable between open and closed states in which the outflow channel is opened and closed by the closing plug and the projection is positioned in the through-hole or projects from the through-hole.

8 Claims, 8 Drawing Sheets

(51) Int. Cl.
    *B29C 73/24*      (2006.01)
    *B60C 23/00*      (2006.01)
    *B65D 83/00*      (2006.01)
(52) U.S. Cl.
    CPC .... *B65D 83/00* (2013.01); *B65D 2501/24242* (2013.01)
(58) Field of Classification Search
    USPC .............................................. 425/12; 141/38
    See application file for complete search history.

(56)            References Cited

FOREIGN PATENT DOCUMENTS

| JP | 2010-167742   |   | 8/2010 |            |
|----|---------------|---|--------|------------|
| JP | 2010167742 A  | * | 8/2010 |            |
| JP | 2012-006348   |   | 1/2012 |            |
| JP | 2012006348 A  | * | 1/2012 | B29C 73/166 |

OTHER PUBLICATIONS

Nakao et al. (JP 2012-006346-A), machine translation Feb. 12, 2021 (Year: 2012).*
International Search Report for International Application No. PCT/JP2017/039656 dated Nov. 28, 2017, 3 pages, Japan.

* cited by examiner

PUNCTURE REPAIR LIQUID HOLDING CONTAINER

TECHNICAL FIELD

The present technology relates to a puncture repair liquid holding container used during injection of puncture repair liquid into a tire by compressed air supplied from a compressor, and particularly relates to a puncture repair liquid holding container having a simple configuration that enables confirmation of a supply state of the compressed air and the puncture repair liquid.

BACKGROUND ART

In recent years, when a tire mounted to a vehicle is punctured, a puncture repair liquid is injected into the tire via the tire valve to temporarily repair the puncture. Examples of a device that allows such a temporary repair include a puncture repair kit (for example, refer to Japan Unexamined Patent Publication No. 2007-06224). Employing a puncture repair kit eliminates the need to provide the vehicle with a spare tire, which makes it possible to save resources and reduce the weight of the vehicle. There is also a further advantage that the space in the vehicle where the spare tire would have been provided can be used for other purposes.

Known puncture repair kits include, for example, a so-called pump-type puncture repair kit that injects a puncture repair liquid held in a puncture repair liquid holding container into the tire by compressed air supplied from an air compressor or the like. A puncture repair liquid holding container used in such a pump-type puncture repair kit typically includes a container body including a holding portion holding the puncture repair liquid and an opening portion, and a cap mounted to the opening portion of the container body. The cap includes a flow path for introducing compressed air from the container exterior and a flow path for discharging the puncture repair liquid in the container interior to the container exterior. Closing plugs are inserted to the flow channels to prevent the leaking of puncture repair liquid from the flow channels during storing. Such closing plugs slide through the flow channels by the pressure of the compressed air fed to the container interior during puncture repair to move to a predetermined position (open state) to open the flow channels.

In such a puncture repair liquid holding container, usually, the state of the container interior is not visible. Thus, there is problem in that it is difficult to determine whether the closing plugs are properly removed and thereby the flow channels are opened. Thus, for example, Japan Unexamined Patent Publication No. 2007-06224 proposes, for a sealing pump-up apparatus including both a puncture repair liquid holding container and a compressor, to provide light-emitting diodes or buzzers as an abnormal-state alarming unit for informing abnormalities to workers when an abnormality occurs while compressed air and a sealing agent (puncture repair liquid) are supplied to the tire interior. However, such a proposal has a problem in that a control circuit is required for operating a mechanism for detecting abnormalities and the abnormal-state alarming unit, and thus the apparatus becomes complex. Thus, there is a need for a measure that enables confirmation of the supply state of compressed air and puncture repair liquid with a puncture repair liquid holding container having a simple configuration.

SUMMARY

The present technology provides a puncture repair liquid holding container having a simple configuration that enables confirmation of the supply state of compressed air and puncture repair liquid.

A puncture repair liquid holding container includes:

a container body including a holding portion holding a puncture repair liquid, and an opening portion disposed at one end of the holding portion; and a cap mounted to the opening portion, the cap including an inflow channel for introducing compressed air from a container exterior, and an outflow channel for discharging the puncture repair liquid inside the holding portion to the container exterior; wherein the outflow channel includes a straight portion and a branch portion, the straight portion including an open end opening toward inside the container body and a closed end being terminated inside the cap, and the branch portion including a communicating end communicating with an intermediate area of the straight portion and an open end opening toward the container exterior, the closed end of the straight portion including a through-hole having an inner diameter smaller than that of the straight portion and penetrating the cap from the closed end to a cap surface in an extending direction of the straight portion; a closing plug having a shape for blocking the straight portion is slidably inserted to the straight portion, the closing plug including a projection portion projecting toward the closed end of the straight portion and being slidable in the through-hole;

the puncture repair liquid holding container has a structure switchable between a closed state in which the closing plug is positioned on the branch portion or closer to the open end of the straight portion than the branch portion, to close the outflow channel and an open state in which the closing plug is positioned closer to the closed end of the straight portion than the branch portion, to open the outflow channel; and a tip of the projection portion reaches the through-hole in the closed state, and the tip of the projection portion projects from the through-hole in the open state.

According to the present technology, since the projection portion projecting outside the container in the open state is provided as described above, the state of the projection portion (the amount of projection) can be viewed to easily confirm the open state of the outflow channel. Additionally, since the main configuration is simple in which the cap has a through-hole and the closing plug has a projection portion, the structure of the puncture repair liquid holding container (puncture repair kit) can be prevented from becoming complex. Moreover, due to such a simple configuration, switching of the closed/open states (i.e., sliding of the closing plug) and the projection of the projection portion are directly connected. Thus, reliability of the confirmation of the open state of the outflow channel is high. In addition, with this structure, the tip of the projection portion is positioned in the through-hole also in the closed state, and the projection portion slides in the through-hole when the closed state and the open state switch. This functions as a guide for preventing tilt of the closing plug in the outflow channel, and the occurrence of defects, such as an opening defect of the outflow channel, can also be prevented.

According to an embodiment of the present technology, a sliding distance L of the closing plug and a projection amount H of the projection portion from the cap surface in the open state preferably satisfy the relationship L≤H. By correlating the sliding distance L and the projection amount H in this way, the projection portion can be pushed in again to return to the original closed state (or a state in which the outflow channel is closed), and the outflow channel can be reclosed.

According to an embodiment of the present technology, a portion of the projection portion projecting from the cap surface in at least the open state preferably has a color different from a color of the cap. In this way, the projection state of the projection portion can be easily determined on the basis of the color difference.

According to an embodiment of the present technology, a spring member urging the closing plug toward the open end of the straight portion is preferably interposed between the closing plug and the closed end of the straight portion. In this way, the closing plug automatically returns to the closed state by the resilient force of the spring member, and thus, liquid leakage can be prevented after use. Additionally, since the closing plug is constantly urged toward the open end of the straight portion, movement of the closing plug due to a change in the container internal pressure during storage (and liquid leakage due to this) can also be prevented.

According to an embodiment of the present technology, a handle is preferably further included disposed at the tip of the projection portion for operating the position of the closing plug from the container exterior. In this way, when a closing defect of the outflow channel occurs, the closing plug can be operated from the container exterior to enter the open state, and the worker can readily solve the defect.

DETAILED DESCRIPTION

Configurations of embodiments of the present technology are described in detail below with reference to the accompanying drawings.

Figure 1:
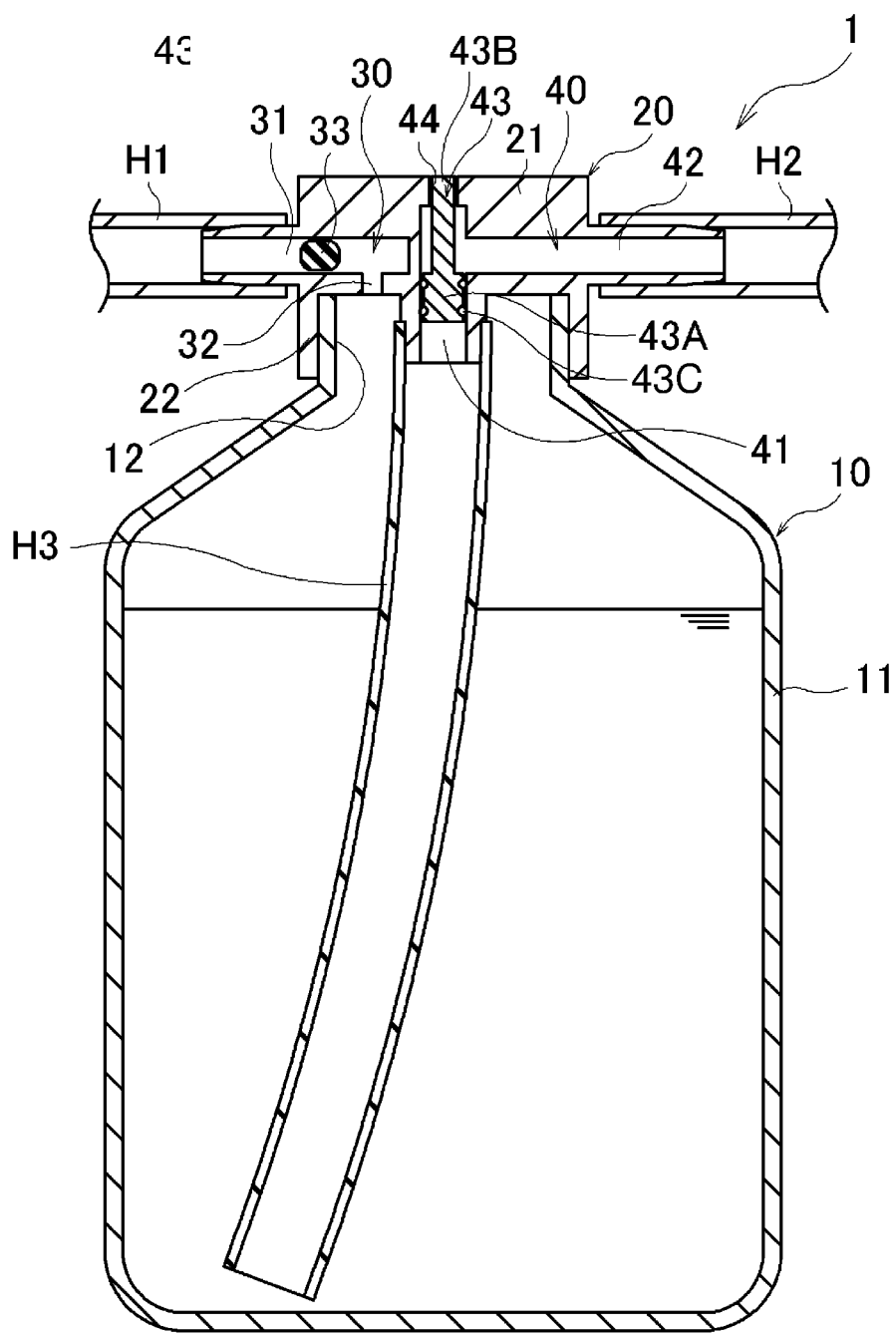
FIG. 1 is a cross-sectional view illustrating an example of a puncture repair liquid holding container in a closed state.
Figure 2:
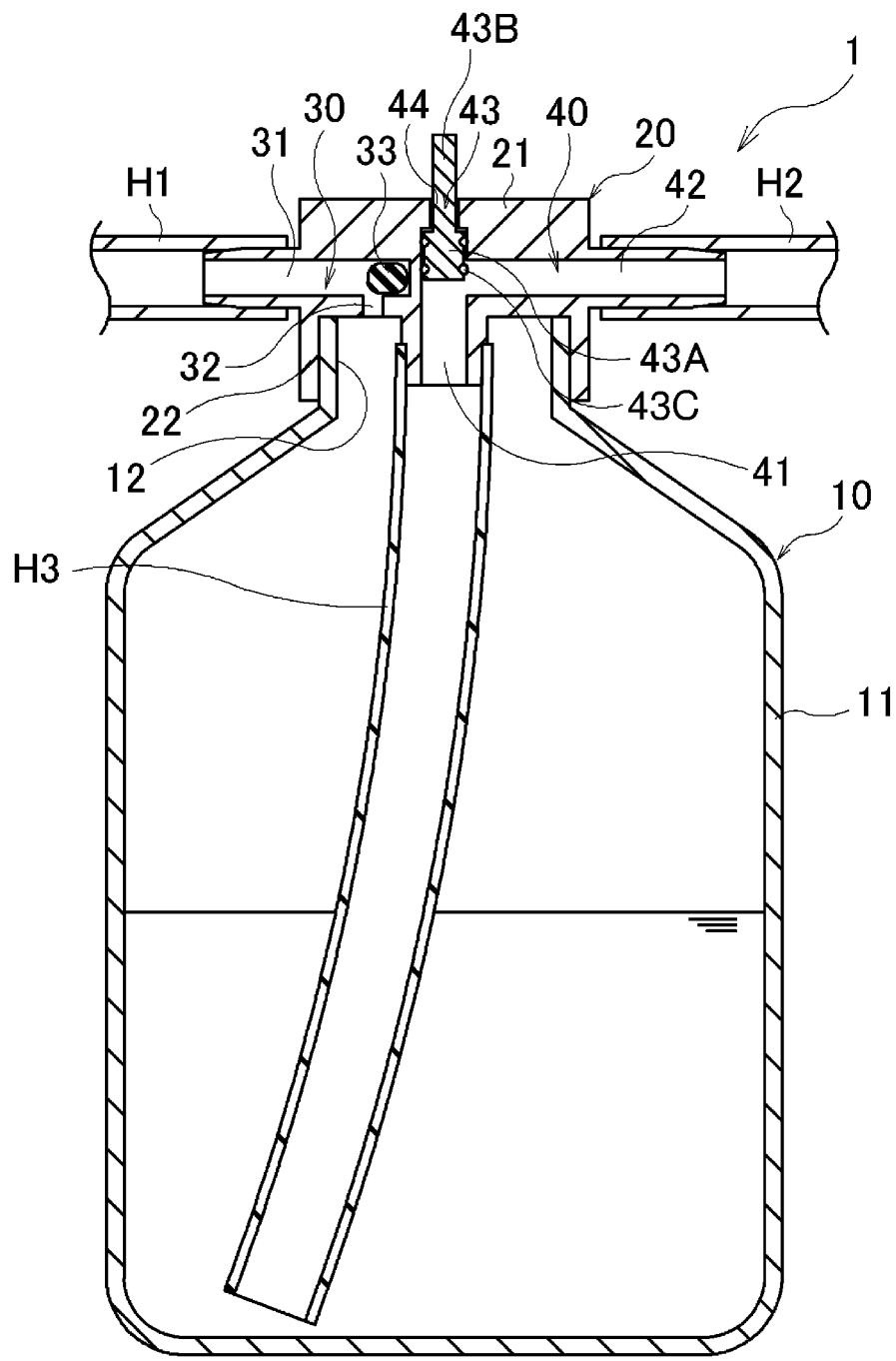
FIG. 2 is a cross-sectional view illustrating an example of a puncture repair liquid holding container in an open state.

As illustrated in FIGS. 1 and 2, a puncture repair liquid holding container 1 (called a "container 1" hereinafter) according to the present technology is constituted of a container body 10 and a cap 20. FIGS. 1 and 2 illustrate a hose H1 for connecting the container 1 to a compressor and a hose H2 for connecting the container 1 to a tire. Since the structures of the hoses H1 and H2 are not particularly limited in the present technology, detailed descriptions thereof are omitted. Additionally, in the illustrated examples, the container interior is provided with a hose H3 including one end connected to a cap 20 and the other end extending to the bottom portion of a container body 10. Since the structure of the hose H3 is also not particularly limited in the present technology, detailed description thereof is omitted.

The container body 10, as illustrated in FIGS. 1 and 2, includes a cylindrical holding portion 11 holding a puncture repair liquid (hereinafter, referred to as "repair liquid") including, for example, rubber latex, and a cylindrical opening portion 12 located adjacent to the upper portion of the holding portion 11 when the container body 10 is erected and discharging the repair liquid during use. When the container 1 is erected, a bottom surface of the holding portion 11 is positioned on a side opposite the opening portion 12. Although omitted in the drawings, the outer circumferential surface of the opening portion 12 may have threads such that the screw on the cap 20 as described below can be screwed in. The holding portion 11 and the opening portion 12 are integrally made of, for example, a synthetic resin such as polypropylene or polyethylene. Note that the opening portion 12 may be more tightly sealed with, for example, a film (not illustrated) before the cap 20 described below is attached, to prevent deterioration of the repair liquid in the container interior and leakage of the repair liquid from the opening portion 12.

Figure 3:
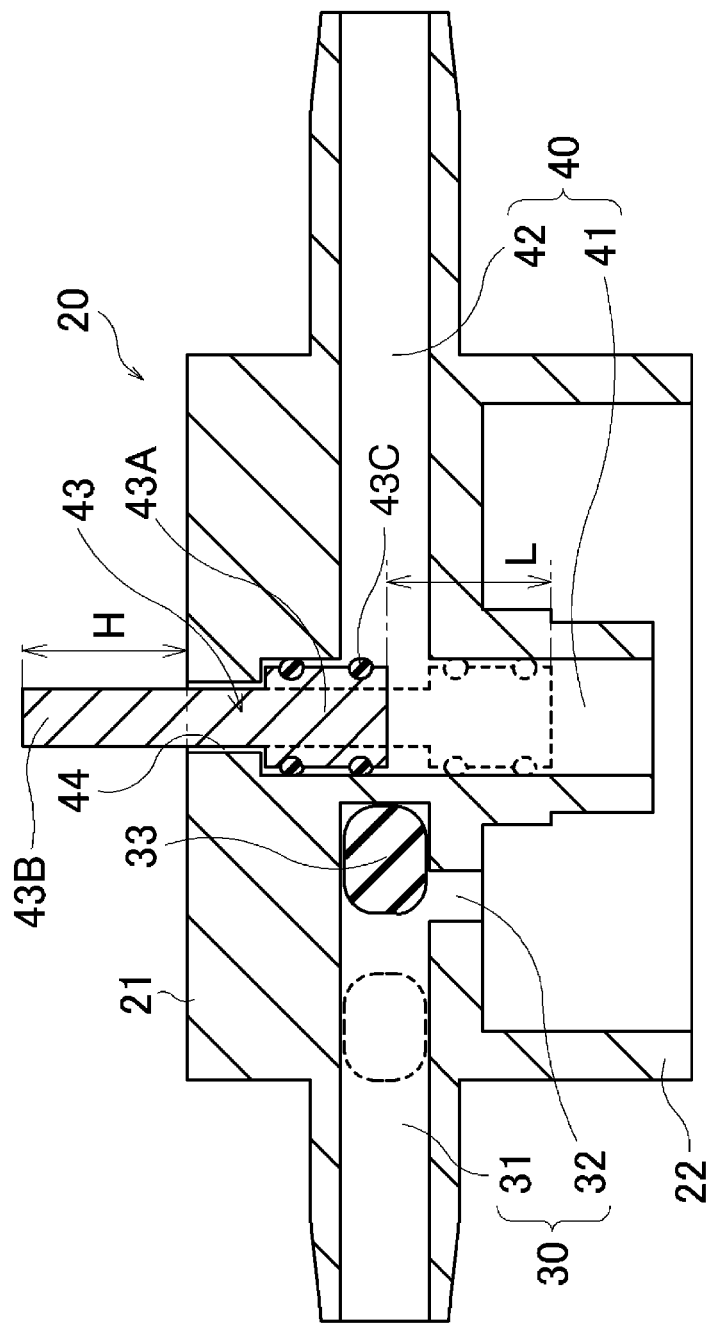
FIG. 3 is a cross-sectional view illustrating an enlargement of a cap.

As illustrated in FIGS. 1 to 3, the cap 20 includes a base portion 21 having a substantially columnar shape and a mounting portion 22 having a substantially cylindrical shape having the same outer diameter as that of the base portion 21 and in which the opening portion 12 is insertable inside. As described above, when the outer circumferential surface of the opening portion 12 is provided with threads, the inner circumferential surface of the mounting portion 22 may be provided with threads that threadedly engage with a screw of the opening portion 12, to threadedly engage with the container body 10 (the opening portion 12) and the cap 20 (the mounting portion 22). The base portion 21 and the mounting portion 22 are integrally made of, for example, a synthetic resin such as polypropylene or polyethylene. The base portion 21 is provided with an inflow channel 30 for introducing compressed air from the container exterior and an outflow channel 40 for discharging the puncture repair liquid in the container interior, as holes penetrating the base portion 21.

As illustrated, the inflow channel 30 includes a straight portion 31 extending in a direction orthogonal to the axis of the container 1 and a branch portion 32 branching from an intermediate area of the straight portion 31 and extending in the axial direction of the container 1. The straight portion 31 includes an open end opening to the container exterior and a closed end terminated inside the cap 20 (base portion 21). In the illustrated example, the open end of the straight portion 31 projects from the base portion 21 toward the container exterior and can be coupled with the above-described hose H1 to connect the container 1 to the pump device. The branch portion 32 includes a communicating end communicating with the straight portion 31 and an open end opening toward the inside of the container body 10 (the holding portion 11). In the straight portion 31, a closing plug 33 made of an elastomer, such as silicone, nitrile rubber (NBR), ethylene propylene diene rubber (EPDM), and natural rubber (NR), and having a shape blocking the inflow channel 30 (the straight portion 31) is slidably inserted. The closing plug 33 is positioned closer to the open end of the straight portion 31 than the branch portion 32, as illustrated in FIG. 1 (the dashed line in FIG. 3) or positioned on the branch portion 32, to close the inflow channel 30 (hereinafter, this state is referred to "closed state"). Additionally, the closing plug 33 is positioned closer to the closed end of the straight portion 31 than the branch portion 32, as illustrated in FIG. 2 (the solid line in FIG. 3), to open the inflow channel 30 (hereinafter, this state is referred to "open state"). The inflow channel 30 enters the above-described closed state during storage to prevent leakage of the repair liquid from the inflow channel 30. On the other hand, when compressed air is sent through the open end of the inflow channel 30 (the straight portion 31) during puncture repair work, the closing plug 33 pushed by the pressure of the compressed air moves to the closed end of the straight portion 31, and the inflow channel 30 enters the opening state in which compressed air can be sent into the container body 10 (holding portion 11) through the inflow channel 30. In this way, the closed state and the open state can be switched in accordance with the position of the closing plug 33. Since the closed state and the open state correspond to the modes described above, liquid leakage from the inflow channel 30 can be prevented in the closed state, and the inflow channel 30 can be opened in the open state without causing the closing plug 33 to be depressed inside the container body 10. Note that the present technology is intended for easily confirming the supply state of the puncture repair liquid and compressed air in the outflow channel 40 described below (the presence of a defect due to a plug opening defect of the inserted closing plug) while reliably preventing liquid leakage of the outflow channel 40 described below. Thus, the structure of the inflow channel 30 is not limited to the illustrated example.

As illustrated, the outflow channel 40 includes a straight portion 41 extending in the axial direction of the container 1 and a branch portion 42 branching from an intermediate area of the straight portion 41 and extending in a direction orthogonal to the axis of the container 1. The straight portion 41 includes an open end opening toward the inside the container body 10 (holding portion 11) and a closed end being terminated inside the cap 20 (the base portion 21). In the illustrated example, the open end of the straight portion 41 projects from the base portion 21 toward inside the container body 10 (holding portion 11) and can be coupled with the above-described hose H3. The branch portion 42 includes a communicating end in communication with the straight portion 41 and an open end opening toward the container exterior. In the illustrated example, the open end of the branch portion 42 projects from the base portion 21 toward the container exterior and can be coupled with the above-described hose H2 to connect the container 1 to the tire.

Similar to the inflow channel 30, a closing plug 43 is slidably inserted to the straight portion 41 of the outflow channel 40. The closing plug 43 includes a plug body 43A having a shape that blocks the outflow channel 40 (straight portion 41) and functioning as a plug that actually blocks the outflow channel 40 (straight portion 41), and a projection portion 43B projecting from the plug body 43A toward the closed end of the straight portion 41 along the axial direction of the straight portion 41. At the extension position of the projection portion 43B at the closed end of the straight portion 41, a through-hole 44 is provided. The through-hole 44 has a size corresponding to the projection portion 43B and penetrates from the closed end of the straight portion 41 toward the container exterior through the extension direction of the straight portion 41. The projection portion 43B is slidably inserted to the through-hole 44. In particular, in the illustrated example, in contrast to the straight portion 41, which is a cylindrical hole, the plug body 43A of the closing plug 43 has a substantially columnar shape, the projection portion 43B has columnar shape having an outer diameter smaller than that of the plug body 43A, the through-hole 44 has a substantially circular cross section having an inner diameter slightly larger than that of the projection portion 43B so that the projection portion 43B can be slidably inserted therein.

The closing plug 43 is positioned closer to the open end of the straight portion 41 than the branch portion 42 of the outflow channel 40, as illustrated in FIG. 1 (the dashed line in FIG. 3) or positioned on the branch portion 42, to close the outflow channel 40 (hereinafter, this state is referred to "closed state"). Additionally, the closing plug 43 is positioned closer to the closed end of the straight portion 41 than the branch portion 42 of the outflow channel 40, as illustrated in FIG. 2 (the solid line in FIG. 3), to open the outflow channel 40 (hereinafter, this state is referred to "open state"). At this time, since the projection portion 43B is slidably inserted to the through-hole 44, the tip of the projection portion 43B reaches the through-hole 44 and is positioned further outside the container than the end portion of the closed end of the through-hole 44, even in the open state. Additionally, since the projection portion 43B moves in cooperation with the closing plug 43, the tip of the projection portion 43B projects from the through-hole 44 to the container exterior in the open state as illustrated and is positioned further outside the container than the position of the tip of the projection portion 43B in a closed state.

In this way, the outflow channel 40 enters the above-described closed state during storage to prevent leakage of the repair liquid from the outflow channel 40. On the other hand, when the puncture repair liquid flows out of the open end of the outflow channel 40 (straight portion 41) due to the pressure of the compressed air fed to the container interior during the puncture repair work, the closing plug 43 pushed by the pressure moves to the closed end of the straight portion 41, the outflow channel 40 switches the open state, and the puncture repair liquid and compressed air are sent through the outflow channel 40 toward the tire. In this way, the closed state and the open state can be switched in accordance with the position of the closing plug 43. Since the closed state and the open state correspond to the modes described above, liquid leakage from the outflow channel 40 can be prevented in the closed state.

At this time, since the projection portion 43B projects to the outside of the container in the open state as described above, the open state of the outflow channel (the supply state of the puncture repair liquid) can be easily confirmed by viewing the state (projecting state) of the projection portion 43B. Specifically, when the projection portion 43B is projected, it can be confirmed that the closing plug 43 has appropriately moved and the closed state has switched to the open state. When the closing plug 43 did not move and the outflow channel 40 did not open due to some kind of defect, the projection portion 43B does not project. Thus, the presence of a plug opening defect can be easily and reliably confirmed. Additionally, according to the present technology, since the mechanism for confirming the open state of the outflow channel 40 is a simple structure mainly including the through-hole 44 provided in the cap 20 and the projection portion 43B of the closing plug 43, the structure of the container 1 (and the puncture repair kit using the container 1) can be prevented from becoming complex. Moreover, due to such a simple structure, switching of the closed/open states (i.e., sliding of the closing plug 43) and the projection of the projection portion 43B are directly connected. Thus, reliability of the confirmation of the open state of the outflow channel 40 is high. In addition, with this structure, the tip of the projection portion 43B is positioned in the through-hole 44 also in the closed state, and the projection portion 43B slides in the through-hole 44 when the closed state and the open state switch. This functions as a guide for preventing tilt of the closing plug 43 in the outflow channel 40, and the occurrence of defects, such as an opening defect of the outflow channel 40 due to the closing plug 43 can also be prevented.

Figure 4A:
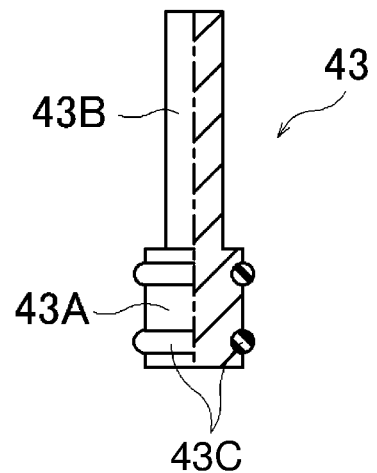
FIGS. 4A and 4B are explanatory diagrams illustrating a cross-section of a portion of an enlargement of a closing plug.
Figure 4B:
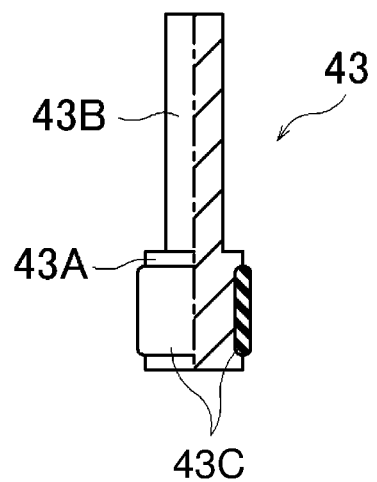

The closing plug 43, for example, as illustrated in FIGS. 4A and 4B, preferably has a design that includes a columnar plug body 43A on which an O-ring 43C made of an elastomer is mounted, and a projection portion 43B having an outer diameter smaller than that of the plug body 43A. The elastomer constituting the O-ring 43C may be, for example, silicone, nitrile rubber (NBR), ethylene propylene diene rubber (EPDM), or natural rubber (NR). Additionally, the plug body 43A and the projection portion 43B, which do not include the O-ring 43C, are preferably integrally made of, for example, a synthetic resin such as polypropylene or polyethylene. In the case where the O-ring 43C is used, it is preferred that sealing properties are prevented from being impaired when the plug body 43A passes the branch portion 42 by providing the O-ring 43C in multiple sections (two sections in the illustrated example) of the plug body 43A in the longitudinal direction, as illustrated in FIG. 4A. Alternatively, even when the O-ring 43C is provided in only one section, it is preferred to maintain the sealing properties by increasing the length of the O-ring 43C along the longitudinal direction of the plug body 43A such that the O-ring 43C is constantly interposed between the plug body 43A and the straight portion 41 when the plug body 43A passes the branch portion 42.

According to the present technology, the open state of the outflow channel (the supply state of the puncture repair liquid) is confirmed by viewing the projecting state of the projection portion 43B as described above. However, the projection portion 43B needs not to be in a non-projecting state (a state in which the tip of the projection portion is positioned in the through-hole 44 or the tip of the projection portion is flush with the cap upper surface) in the closed state. That is, even when the projection portion 43B preliminarily projects from the cap surface in the closed state, the open state of the outflow channel 40 can be confirmed through the difference in the projection amounts of the projection portion 43B so long as the projection portion 43B projects further in the open state. Of course, when the tip of the projection portion 43B is positioned in the through-hole 44 or if the tip of the projection portion 43B is flush with cap upper surface in the closed state, the switching from the closed state to the open state causes the projection portion 43B to transition from a state in which the projection portion 43B does not project to a state in which the projection portion 43B projects from the cap upper surface. Thus, the open state of the outflow channel 40 can be easily confirmed.

Since a portion (the projection portion 43B) of the closing plug 43 according to the present technology projects outside the cap in the open state, as described above, by pushing the protruding portion toward the through-hole 44 after the puncture repair work, the plug body 43A slides in the straight portion 41 in cooperation with the projection portion 43B, and the closing plug 43 can return to the closed state in which the outflow channel 40 is closed. In particular, the sliding distance L of the closing plug 43 (i.e., the movement distance from the closed state (the dashed line in FIG. 3) to the open state (the solid line in FIG. 3)) and the projection amount H from the cap surface of the projection portion 43B in the open state satisfy the relationship $L \leq H$ and enable returning to the original closed state (or a state in which the outflow channel is closed without matching the original closed state), thereby enabling reliable reclosing of the outflow channel 40.

Figure 5:
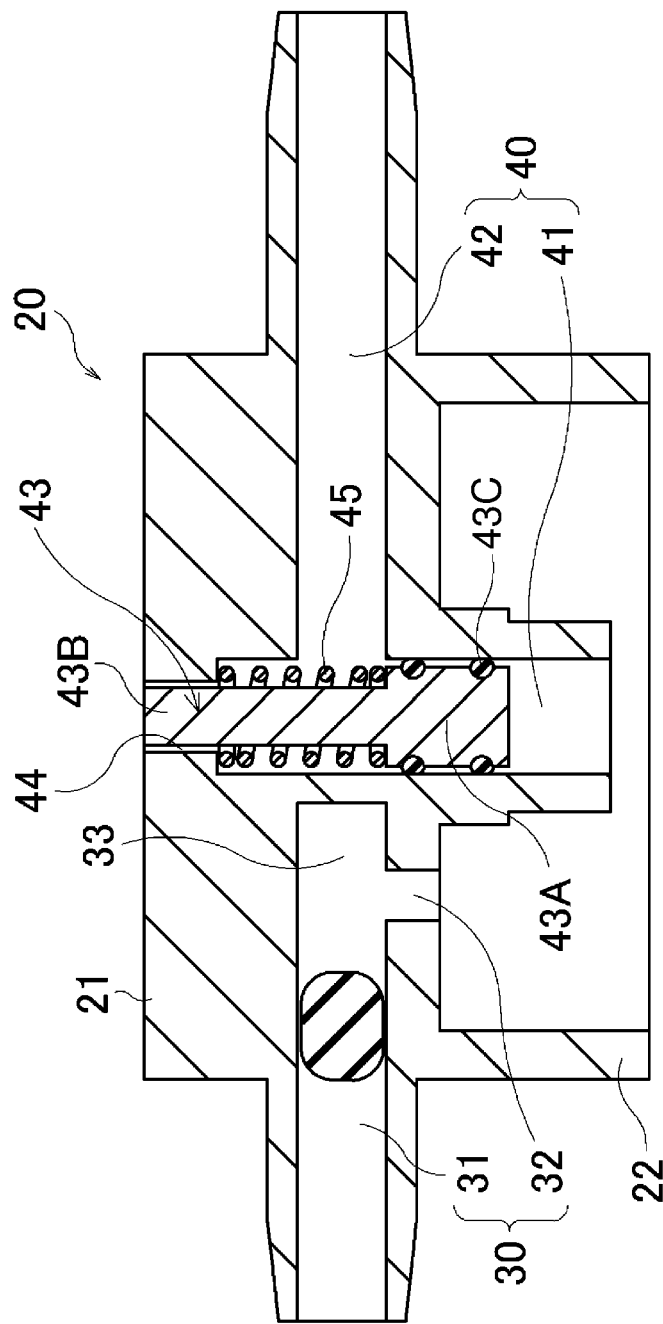
FIG. 5 is a cross-sectional view illustrating another example of the cap.

When reclosing is enabled as described above, a spring member 45 that urges the closing plug 43 toward the open end of the straight portion 41 may be interposed between the closing plug 43 and the closed end of the straight portion 41, as illustrated in FIG. 5. In such a design, the closing plug 43 automatically returns to the initial position by the resilient force of the spring member 45, and the state returns to the closed state. Thus, liquid leakage can be reliably prevented after use. Additionally, since the closing plug 43 is constantly urged toward the open end of the straight portion 41, movement of the closing plug 43 due to a change in the container internal pressure during storage (and liquid leakage due to this) can also be prevented.

Figure 6:
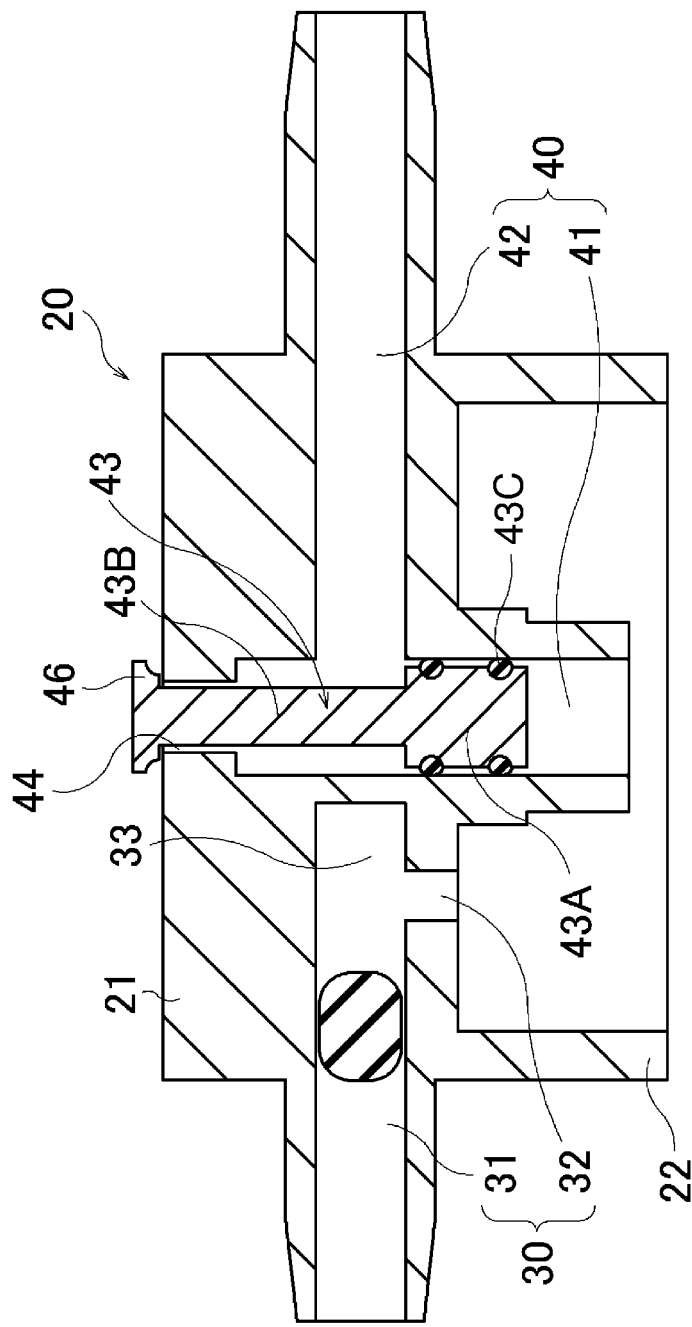
FIG. 6 is a cross-sectional view illustrating another example of the cap.
Figure 7:
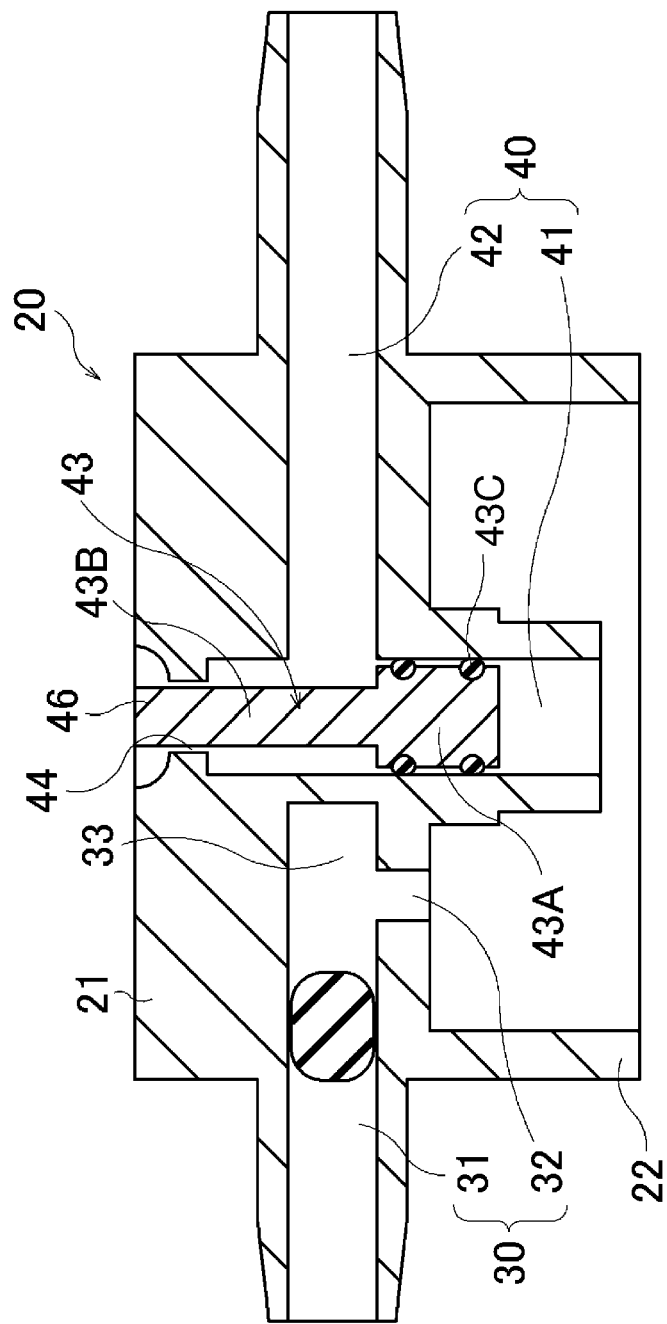
FIG. 7 is a cross-sectional view illustrating another example of the cap.

According to the present technology, a handle 46 for operating the position of the closing plug 43 in the straight portion 41 may be provided at the tip of the projection portion 43B, as illustrated in FIG. 6. By providing such a handle 46, not only is reclosing possible as described above, but also, when a plug opening defect of the outflow channel 40 occurs, the closing plug 43 can be operated from the container exterior to cause the outflow channel 40 to enter the open state. When the projection portion 43B preliminarily projects from the cap surface in the closed state, the portion projecting from the cap surface can be grabbed as the handle 46, to operate the closing plug 43 from the container exterior. By providing a sufficiently large handle 46 at the tip of the projection portion 43B, as illustrated in FIG. 6, the closing plug 43 can be readily operated. The specific shape of the handle 46 is not particularly limited so long as it has a shape that can be readily operated by the worker. As illustrated in FIG. 7, the periphery of the through-hole 44 (the projection portion 43B) on the cap surface may be depressed such that when the tip of the projection portion 43B is flush with the cap upper surface, the tip of the projection portion 43B projects from the cap surface (the surface of the depressed portion), and the tip of the projection portion 43B may be easily grabbed as the handle 46.

For easy confirmation of the projection of the projection portion 43B from the cap 20, the portion of the projection portion 43B projecting from the surface of the cap 20 may be colored with a color different from that of the surface of the cap 20 in at least the open state. When the projection portion 43B is colored in this way, the color of the projection portion 43B may not necessarily be a single color and may be multiple colors that change depending on the projection amount of the projection portion 43B. Additionally, when a portion of the projection portion 43B preliminarily projects in the closed state, the preliminarily projecting portion and the portion that is exposed for the first time in the open state may be different colors, to achieve easy confirmation of the projecting state of the projection portion 43B.

Figure 8:
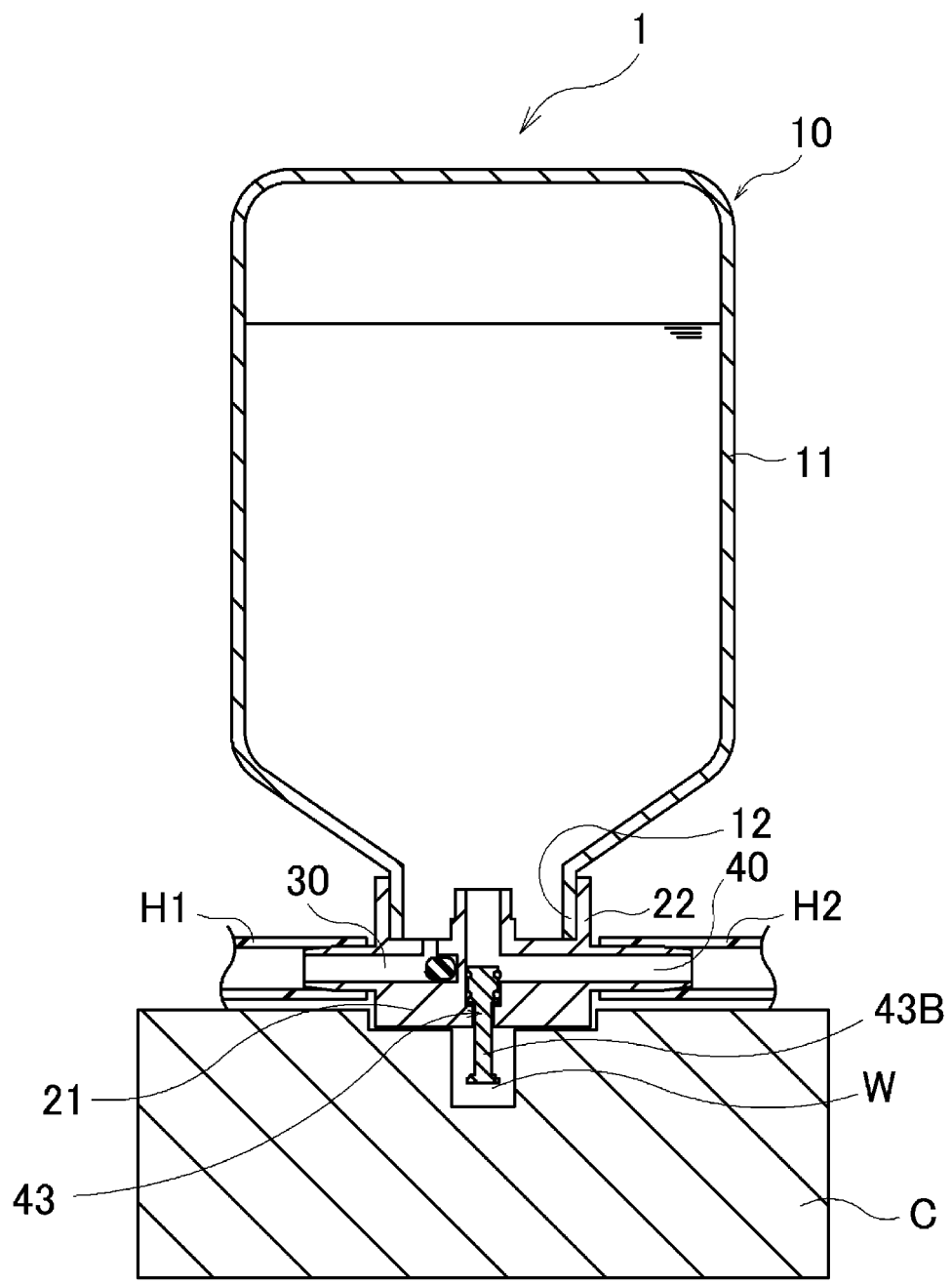
FIG. 8 is a schematic diagram illustrating an example of a puncture repair liquid holding container (inverted type).

The present technology can be applied not only to a so-called erected type puncture repair liquid holding container 1 such as the above-described container 1 in which the container body 10 is erected such that opening portion 12 faces upward during use, but also to a so-called inverted type puncture repair liquid holding container 1 in which the container body 10 is inverted such that the opening portion 12 faces downward during use, as illustrated in FIG. 8. However, the cap 20 of the inverted type container 1 is usually mounted to the compressor C, etc., as illustrated, to enhance the stability during installation. Thus, the compressor C, etc., on which the container 1 in the inverted state is installed can receive the projection portion 43B projecting from the cap surface, and a space W may be provided through which the projecting state of the projection portion 43B can be confirmed from, for example, the side of the compressor C, etc.

The invention claimed is:

1. A puncture repair liquid holding container comprising:
  a container body including a holding portion holding a puncture repair liquid, and an opening portion disposed at one end of the holding portion; and
  a cap mounted to the opening portion, the cap including an inflow channel for introducing compressed air from a container exterior, and an outflow channel for discharging the puncture repair liquid inside the holding portion to the container exterior; wherein
  the outflow channel includes a straight portion and a branch portion, the straight portion including an open end opening toward inside the container body and a closed end being terminated inside the cap, and the branch portion including a communicating end communicating with an intermediate area of the straight portion and an open end opening toward the container exterior, the closed end of the straight portion including a through-hole having an inner diameter smaller than that of the straight portion and penetrating the cap from the closed end to a cap surface in an extending direction of the straight portion; a closing plug including a plug body having a shape for blocking the straight portion is slidably inserted to the straight portion, the closing plug including a projection portion projecting toward the closed end of the straight portion and being slidable in the through-hole;
  the puncture repair liquid holding container has a structure switchable between a closed state in which the closing plug is positioned on the branch portion or closer to the open end of the straight portion than the branch portion, to close the outflow channel and an open state in which the closing plug is positioned closer to the closed end of the straight portion than the branch portion, to open the outflow channel;
  a tip of the projection portion reaches the through-hole in the closed state, and the tip of the projection portion projects from the through-hole in the open state; and
  when the closing plug is positioned in the open state a space occupied by the plug body in the closed state is unoccupied by any structure of the cap.

2. The puncture repair liquid holding container according to claim 1, wherein a sliding distance L of the closing plug and a projection amount H of the projection portion from the cap surface in the open state satisfy a relationship $L \leq H$.

3. The puncture repair liquid holding container according to claim 1, wherein a portion of the projection portion projecting from the cap surface in at least the open state has a color different from a color of the cap.

4. The puncture repair liquid holding container according to claim 1, wherein a spring member urging the closing plug toward the open end of the straight portion is interposed between the closing plug and the closed end of the straight portion.

5. The puncture repair liquid holding container according to claim 1, further comprising a handle disposed at the tip of the projection portion for operating a position of the closing plug from the container exterior.

6. The puncture repair liquid holding container according to claim 2, wherein a portion of the projection portion projecting from the cap surface in at least the open state has a color different from a color of the cap.

7. The puncture repair liquid holding container according to claim 6, wherein a spring member urging the closing plug toward the open end of the straight portion is interposed between the closing plug and the closed end of the straight portion.

8. The puncture repair liquid holding container according to claim 7, further comprising a handle disposed at the tip of the projection portion for operating a position of the closing plug from the container exterior.

* * * * *